United States Patent Office 3,238,185
Patented Mar. 1, 1966

3,238,185
FERROCENE POLYMERS
Eberhard W. Neuse, Santa Monica, Calif., assignor to Douglas Aircraft Company, Inc., Santa Monica, Calif.
No Drawing. Filed Oct. 29, 1962, Ser. No. 233,913
7 Claims. (Cl. 260—80)

This invention relates to ferrocene polymers consisting of chains of the following type:

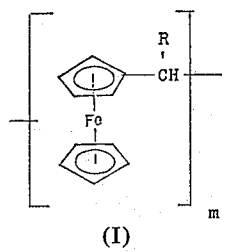

(I)

This invention also relates to methods of preparation of such polymers. In Formula I, R represent hydrogen, a low molecular weight alkyl group (methyl, ethyl, propyl, etc.) or aryl or alkaryl groups such as phenyl, methylphenyl, ethylphenyl, etc. In the above Formula I, the two five-membered rings represent cyclopentadienyl radicals, and it will be understood that the representation indicates a "sandwich" type of compound in which the iron atom is located centro-symmetrically between the two cyclopentadienyl rings which are in parallel planes, and it shares electrons with these rings in a hybridized system. The subscript $m$ is an integer which may have a low value, e.g., 2 to 4 in the case of oligomers, up to high values e.g., 50.

Formula I is intended to include a mixed substitution scheme comprising homoannular substitution in 1,2- and 1,3-position according to IIa and IIb, respectively:

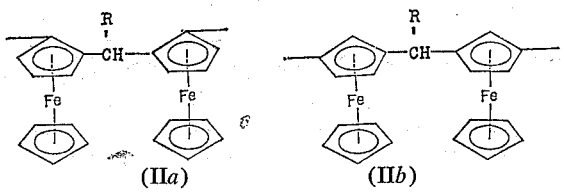

as well as heteroannular substitution of the type IIc:

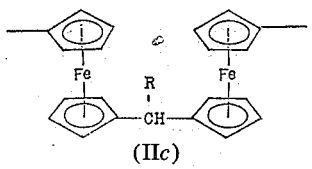

Infrared spectroscopic evidence indicates a predominant proportion of homoannular substitution, at least in the lower molecular range.

Formula I also implies a linear chain structure. Actually, there is strong infrared evidence to suggest a moderate degree of branching. Hence, in this respect, the structural scheme as depicted by I must be regarded as simplified.

The available analytical data suggest the over-all structure to be as depicted by III:

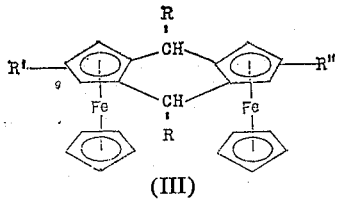

(III)

wherein R is defined as above and R' and R" denote polymer chains of the type I, each chain being terminated by a ferrocenyl group.

These polymers are useful, inter alia as intermediates in the preparation of other materials and as substitutes for ferrocene itself. For example, ferrocene is known to have a high temperature resistance but it is relatively volatile. The ferrocene polymers represented by Formula I also have a high temperature stability and they have the advantage, compared to ferrocene, of a much lower volatility. In those polymers wherein R=H, the ratio of ferrocene to non-ferrocene (i.e., to groups linking the ferrocenyl groups) is very high, therefore polymerization does not greatly diminish the amount of ferrocenyl units (or the atoms of iron) per pound of material. These polymers can be used to advantage in sealants, varnishes and laminates, particularly to impart heat stability. Thus these polymers can be added to phenolic resins in the A stage to produce adhesives, potting agents and laminating agents, wherein the ferrocenyl polymers impart greater heat stability. Also, these polymers can be used as substitutes (having much lower volatility) for ferrocene as catalysts in combustion reactions. A further use is as electron exchange agents, by reason of the reversible reaction $$Fe^{++} \rightleftarrows Fe^{+++}$$

Thus by passing a solution of a reducible ion through a column of such polymer it can be reduced.

These polymers have been prepared by two different methods of polycondensation, starting either with ferrocenyl carbinols or with N,N-dimethylaminomethyl substituted ferrocene, as will be further outlined below.

*Method I.—Polycondensation of ferrocenyl carbinols*

Ferrocenyl carbinols of the following type,

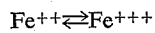

(IV)

are polymerized by condensation. In Formula IV, Fc denotes the monosubstituted ferrocenyl group; R represents hydrogen (i.e., hydroxymethylferrocene, or compound V); methyl (i.e., 1-hydroxyethylferrocene or compound VI); phenyl (i.e., α-hydroxybenzylferrocene or compound VII), or other groups such as ethyl, propyl and other lower alkyl groups, various alkaryl groups such as methylphenyl and ethylphenyl; various aralkyl groups such as benzyl; etc. It will also be understood that the cyclopentadienyl rings of the ferrocenyl group may be substituted, e.g., by alkyl groups such as methyl, ethyl, propyl; by aryl, aralkyl and alkaryl groups such as any of those described above with reference to R; by halogens (e.g., Cl or Br); etc. One or more such groups may be present as substituents on one or both of the cyclopentadienyl rings. The condensation proceeds via intermediate ethers VIII, with R standing for the substituents mentioned above, and Fe again denoting the monosubstituted ferrocenyl group.

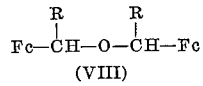

(VIII)

The following specific examples will serve further to illustrate the practice and advantages of the present invention.

GENERAL PROCEDURE

Catalysts used were aluminum chloride, zinc chloride, and hydrochloric acid. Anhydrous aluminum chloride, resublimed, was used as received. Commercially available anhydrous zinc chloride was further dried by heating above the melting point for several hours; the salt, while still hot, was ground and bottled under dry nitrogen. The three monomers V, VI, and VII were prepared as follows: Hydroxmethylferrocene (V) was synthesized by the method of Lindsay and Hauser, J. Org. Chem., 22, 355 (1957), and was purified chromatographically in hexane solution; M.P. 80°[1] (hexane). 1-hydroxyethylferrocene

[1] All temperature expressed in degrees centigrade.

(VI) was obtained by sodium borohydride reduction of acetylferrocene in 20:80 dioxane-ethanol solution; M.P. upon chromatographic purification and recrystallization from hexane, 78–80°. In an analogous procedure, α-hydroxybenzylferrocene (VII) was prepared from the corresponding benzoyl derivative; M.P. 80–81°.

For preparing polymers of the three ferrocenyl carbinol monomers V, VI, and VII, essentially the same general technique was employed as described below.

Into a round-bottom flask equipped with a mechanical stirrer was charged the well ground mixture of ferrocenyl carbinol (V, VI, or VII) and catalyst; the latter in concentrations as specified in the individual examples below. The mixture was heated in an oil bath with stirring under the specified conditions of time and temperature. During the condensation, a slow current of dry nitrogen was conducted over the melt. Unless otherwise stated, heating was continued to the point of maximum conversion, which was usually attained when the melt had reached a high-viscous, resinous consistency rendering further stirring difficult. The cold, brittle melt was ground and briefly washed with methanol. The dried resin was dissolved portionwise in a total of 60–80 ml. of dioxane for each 10 g. of solids and was reprecipitated by stirring the filtered solution dropwise into the four-fold volume of 95% aqueous methanol. Upon filtering and drying in vacuo, the crude polymer was obtained as a dirty-yellow powdery solid. With low molecular polymers, a small second crop, sometimes resinous, was collected from the mother-liquor by addition of excess water. The total crude yield of vacuum-dried product amounted to 85–96%. To remove traces of polymeric oxidation products, the polymer was rapidly passed in benzene solution through a small chromatographic column packed with activated alumina. The material recovered from the benzene eluate was then fractionally precipitated in the conventional manner from benzene solution at 25±0.5° in a thermostatically controlled water bath, using methanol and, finally, aqueous methanol as the precipitants. To be obtained in powdery form, the crude, resinous fractions were reprecipitated from dioxane solution in the manner initially described and were vacuum-dried for one week at a temperature sufficiently below the melting range to prevent sintering. The average number of fractions thus isolated amounted to 10. (In several instances, as individually mentioned, cruder fractionations were carried out resulting in a smaller number of less monodisperse fractions.) To minimize loss by oxidation, peroxide-free dioxane was employed and all filtrations were done with highest feasible speed. For all individual fractions within a given polymer series essentially identical elemental composition was found. From each series, 5 fractions were randomly selected, each one representative of a certain molecular weight range. In Table I, for these fractions there are listed the melting points (M.P.), number-average molecular weights ($M_n$), and calculated and found elemental analytical data. $M_n$ was determined from benzene solution using a Mechrolab vapor pressure osmometer.

The fractionated polymers, with colors shifting from yellow to tan with increasing molecular weight, were infinitely soluble in such solvents as benzene, dioxane, N-methylpyrrolidone, chloroform. They were insoluble in water and practically so in hexane and aliphatic alcohols. All polymers were electrostatically chargeable; films, ever so brittle, could be cast from melt or solution.

EXAMPLE 1

*Polycondensation of hydroxymethylferrocene (Monomer V)*

(A) *With $ZnCl_2$ as catalyst.*—At 90° oil-bath temperature, the catalyst concentration being 1% by weight of carbinol, the starting material formed a uniform melt, which soon solidified to an orange-brown crystalline mass essentially constituting di-(ferrocenylmethyl)ether, (compound VIII with R=H). A sample of this intermediate was twice recrystallized from hexane to afford orange prisms, M.P. 132°; on admixture with authentic product prepared by the method of Hauser, J. Org. Chem., 23, 2007 (1958), no depression was observed. To allow the ether to remelt, the bath temperature was briefly raised to 130° and was then maintained for approximately 1 hour at 110° until blocking of the stirrer occurred. The reaction product was worked up as previously described to give crude polymer in 93% yield, partially melting at 130–150°, $M_n$ of unfractionated resin: 3450.

*Analysis.*—Calcd. for III (R=R): C, 66.71%; H, 5.09%; Fe, 28.20%. Found: C, 66.84%; H, 5.21%; Fe, 27.90%.

In order to prevent oxidation of the polymer on the alumina adsorbent used for chromatographic purification, the latter was partially deactivated by exposing it for 20 hours to air conditioned at 25° C. and 40% relative humidity. By fractional precipitation, 9 fractions were isolated with $M_n$ values of the major portion (all center fractions approximating half the total weight) falling within the range 2500–5000. Representative fractions of this and the following experiments are listed as Nos. 1 through 5 in Table I.

With 2% $ZnCl_2$ and the bath temperature maintained at 135–140° throughout the reaction, the condensation was substantially completed within 25 minutes. The crude polymer (yield 96%) began to sinter at 150–170°. $M_n$ 4500; $M_n$ range of major portion of subfractions with overall weight approximating 50% of total: 4000–8000. An experiment conducted for comparison at the same temperature, but with the $ZnCl_2$ concentration increased to 20%, was completed within 5 minutes. The crude polymer, obtained in 91% yield, had $M_n$ 5600 (no subfraction performed). A polymer of practically identical composition resulted from condensation of the ether VIII (R=H) in place of the carbinol V.

(B) *With hydrochloric acid as catalyst.*—The catalyst, 1% HCl (by weight of carbinol) employed as a 10% aqueous solution, was stirred homogeneously into the powdered carbinol. Total heating time was 80 minutes, the bath temperature being 130° during the initial step of ether formation and 110° for the polycondensation phase proper. The crude polymer, partially melting at 110–130°, $M_n$ 2850, was obtained in 86% yield. It was further subdivided in 5 fractions only; the second fraction constituting nearly one-half the total weight, $M_n$ 3550, showed beginning melting at 150°.

(C) *With $AlCl_3$ as catalyst.*—Applied in a concentration of 1% by weight of starting material, this catalyst required approximately 1 hour reaction time at 110° to give crude, tan-colored polymer in 87% yield, partially melting near 200°, $M_n$ 5200 (practically no low molecular members formed).

EXAMPLE 2

*Polycondensation of (1-hydroxyethyl)ferrocene (VI)— Formation of Polymer Series III (with R=$CH_3$)*

Reaction conditions and results of the various runs are summarized in Table II. Five typical polymer fractions are listed as Nos. 6 through 10 in Table I. The intermediate ether (VIII, with R=$CH_3$) was isolated in one experiment; upon repeated recrystallization from hexane, it was collected as orange needles, M.P. 82–83°.

*Analysis.*—Calcd. for $C_{24}H_{26}OFe_2$: C, 65.19; H, 5.93; Fe, 25.26. Found: C, 65.03; H, 6.10; Fe, 25.04.

EXAMPLE 3

*Polycondensation of α-hydroxybenzylferrocene (VII)—Formation of Polymer Series III (with R=C₆H₅)*

All experimental details are given in Table II. The fractions Nos. 11 through 15, recorded in Table I, are representative of this polymer series.

*Method II.—Polycondensation of N,N-dimethylaminomethyl substituted ferrocenes*

This class of compounds known to those skilled in the art as Mannich bases, has the type formula

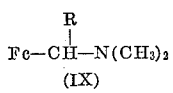

(IX)

TABLE I

| Fraction Number | Polymer Series | M.P.[a] (° C) | $M_n$ | Calculated Analysis (percent)—All fractions | | | Analysis Found (percent) | | |
|---|---|---|---|---|---|---|---|---|---|
| | | | | C | H | Fe | C | H | Fe |
| 1 | III (R=H) | — | 14,900 | 66.71 | 5.09 | 28.20 | 66.61 | 5.10 | 27.79 |
| 2 | | — | 7,900 | | | | 66.58 | 5.24 | 27.87 |
| 3 | | [b]150/170 | 4,450 | | | | 66.77 | 5.27 | 28.22 |
| 4 | | [c]160 | 2,950 | | | | 66.56 | 5.21 | 27.96 |
| 5 | | 155 | 1,700 | | | | 66.85 | 5.38 | 28.11 |
| 6 | III (R=CH³) | [b]170/200 | 9,600 | 67.96 | 5.70 | 26.34 | 67.26 | 5.60 | 26.09 |
| 7 | | [c]165 | 4,650 | | | | 67.78 | 5.91 | 26.27 |
| 8 | | 125/130 | 1,960 | | | | 68.18 | 5.78 | 26.32 |
| 9 | | 90/95 | 1,060 | | | | 67.99 | 5.85 | 26.15 |
| 10 | | 70/75 | 790 | | | | 68.03 | 5.72 | 26.23 |
| 11 | III (R=C⁶H⁵) | — | 7,500 | 74.48 | 5.15 | 20.37 | 74.14 | 5.31 | 20.15 |
| 12 | | [c]175 | 4,250 | | | | 74.20 | 5.16 | 20.47 |
| 13 | | 165 | 2,770 | | | | 74.35 | 5.15 | 19.98 |
| 14 | | 140/145 | 1,880 | | | | 74.51 | 5.20 | 20.25 |
| 15 | | 125 | 1,110 | | | | 74.30 | 5.21 | 20.28 |

[a] Upper limiting value of the melting range, denoting distinct fusing as indicated by a glossy surface of the sintered sample and wetting of the capillary wall.
[b] Sintering only.
[c] No clear melting.

TABLE II

| Polymer Series | Concentration and Type of Catalyst [a] | Bath Temp. (° C.) | Time (Min.) | Yield of Crude Polymer (Percent) | $M_n$ of Crude Polymer | Melting-Range of Crude Polymer (° C.) | Approx. $M_n$ Range of Major Portion of Center Fractions[c] |
|---|---|---|---|---|---|---|---|
| III (R=CH₃) | 1% ZnCl₂ | 120 | 60 | 91 | 1,210 | 80–95 | 1,000–2,100 |
| | 2% ZnCl₂ | 120 | 30 | 86 | 1,100 | 75–100 | 1,200–2,500[b] |
| | 2% ZnCl₂ | 140 | 60 | 93 | 1,370 | 85–105 | 1,200–3,500[b] |
| | 10% ZnCl₂ | 140 | 10 | 90 | 1,990 | 100–130 | 1,300–3,900 |
| | 0.7% AlCl₃ | 120 | 60 | 87 | 1,120 | 80–110 | 900–2,000 |
| | 1% HCl | 110 | 40 | 87 | 790 | 50–90 | 800–1,440 |
| III (R=C₆H₅) | 1.5% ZnCl₂ | 120 | 60 | 93 | 2,180 | 120–150 | 1,900–4,000 |
| | 1.5% ZnCl₂ | 125 | 180 | 94 | 2,500 | 120–155 | 2,200–5,000 |
| | 3.2% ZnCl₂ | 125 | 180 | 89 | 3,000 | 135–170 | 2,500–5,000 |
| | 5% ZnCl₂ | 120 | 20 | 92 | 2,120 | 110–145 | 1,500–3,000 |
| | 1% ZnCl₂ | 100 | 40 | 86 | 2,730 | 135–165 | 2,500–5,000 |
| | 1.5% HCl | 125 | 180 | 85 | 1,910 | 100–135 | 1,600–2,800 |

[a] Concentrations in percent by weight of starting material.
[b] Essentially same result with ether VIII (R=CH₃) in place of carbinol.
[c] All center fractions totaling approximately one-half the over-all polymer weight after fractionation.

General comments and comments on mechanism

The results summarized in the examples above demonstrate that a large variety of acidic catalyst are effective to polymerize ferrocenyl carbinols. Lewis type acids such as aluminum chloride and zinc chloride are preferred. (The Lewis concept of acids and bases is described, for example, in Fieser and Fieser, "Advanced Organic Chemistry," page 19.) Polycondensation proceeds by way of a dinuclear ether of the type VIII. In certain cases these ethers were isolated in early stages and identified. These ethers vanished almost entirely within less than one hour of reaction.

Generally, after a certain reaction period, the molecular weight reached a maximum value at a given temperature and catalyst type and concentration, and excessive heating eventually resulted in partial decomposition. Therefore, reaction times and temperatures were maintained at a minimum level necessary to ensure optimum conversion.

wherein R and Fc have the same meaning described above and either or both of the cyclopentadienyl rings of the ferrocenyl group may be substituted as described above.

Method I discussed in the preceding section and illustrated by Example 1 requires the preparation of hydroxymethylferrocene,

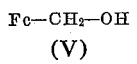

(V)

This synthesis is cumbersome and time-consuming, requiring the following reactions:

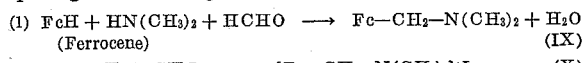

Wherein Fc again represents the monosubstituted ferrocenyl nucleus.

I have now discovered that polymers of structure III (R=H) identical to those obtained from hydroxymethylferrocene (V) can be prepared more easily by directly polymerizing compound IX above; i.e., by polymerizing N,N-dimethylaminomethylferrocene. This compound can be prepared in one step by reaction (I) above.

(I) 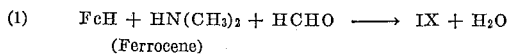

(Ferrocene)

For example, ferrocene is refluxed for 5 hours in glacial acetic acid solution with equimolar amount of dimethylamine and paraformaldehyde. Upon removal of unreacted ferrocene by precipitation with water, the Mannich base IX is liberated by excess alkali, extracted with ether and isolated by fractional distillation in vacuo; B.P. 130–132° C. at 3 mm. See Hauser, J. Org. Chem., 22, 355 (1957).

Polycondensation of IX can be accomplished, I have discovered, by reaction in the melt phase in the presence of Lewis acids, preferably $ZnCl_2$, as catalysts. Other Lewis acids such as $AlCl_3$ and mineral acids such as HCl may be used, but I prefer $ZnCl_2$, most advantageously in combination with HCl or water. Best yields are obtained with a $ZnCl_2$ concentration as high as 50 mole percent and co-use of 100 mole percent of HCl. The latter component is introduced in the form of the hydrochloride of the Mannich base IX. While offering the advantage of accurate dosage coupled with short reaction times, this procedure was found not always to give reproducible yields. By adding, instead, the required amount of HCl as aqueous hydrochloric acid, the initial reaction mixture remains liquid long enough to allow for more homogeneous distribution of the Lewis acid. In spite of longer reaction times, the latter procedure, avoiding the additional step of preparing the HCl salt, appears to be somewhat preferable. Conveniently, the polycondensation is carried out by reacting N,N-dimethylaminomethylferrocene hydrochloride with anhydrous zinc chloride in a 2:1 molar ratio, or by reacting the free Mannich base IX with zinc chloride and concentrated aqueous hydrochloric acid in a molar ratio of 2:1:2. The reactions are preferably performed at temperatures ranging from 150 to 180° C., preferentially 170° C., in the melt phase under a nitrogen blanket, with total heating times in the range from 2 to 10 hours. Solubility and precipitability tests periodically conducted on the gradually resinifying mass aid in determining the end point. Besides the polymer, a salt-like complex believed to exhibit the following tetrachlorozincate structure (XI)

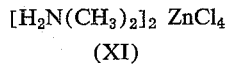

(XI)

is formed comprising the catalyst components as well as the dimethylamine eliminated during the condensation. Upon suitable separation, by selective extraction and reprecipitation, from both the complex XI and traces of crosslinked material, the crude polymer is obtainable as a yellow powdery solid in yields approximating 85–90%, with number-average molecular weights ranging from 3000 to 10,000.

Any deviation from the stated molar ratio towards lower concentration levels of the catalyst components has been found to entail prolonged reaction periods coupled with diminished yields. In contrast, employing a higher than equimolar concentration of, e.g., HCl leads to considerably shortened reaction times. At the same time, however, crosslinking and even partial decomposition of the ferrocene unit is promoted, necessitating meticulous control of the proceeding condensation to ensure termination at the point of optimum content of soluble polymer. With HCl concentration increased well above 1.1 moles for every mole of Mannich base, the yield in soluble polymer drops substantially in favor of crosslinked matter and decomposition products.

With the Lewis acid as the sole catalyst even on substantially extended heating, substantial yield reductions are noticeable. In this case, adding traces of water improves the yields. Still better results are obtained by employing an equimolar ratio of Mannich base IX, zinc chloride and water.

It has been found that in the polycondensation reaction of N,N-dimethylaminomethylferrocene by any of the above-described procedures a complex of the composition XII

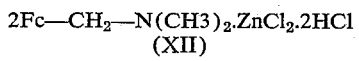

(XII)

is formed as an intermediate. This complex constituting an addition compound of N,N-dimethylaminomethylferrocene IX, zinc chloride and HCl in the molar ratio 2:1:2, can be prepared as the main product by heating, e.g., the mentioned components in the molar ratio listed for 5–10 minutes at 170° and purifying the resinous addition compound by reprecipitation.

The compound can also be obtained in crystalline form by recrystallization of the resinous product from water. The crystalline form is believed to occur as the ionic tetrachlorozincate salt. Both forms of XII, when heated in the manner outlined above, lead to the formation of polymer III (R=H).

The polycondensation of N,N-dimethylaminomethylferrocene under the various conditions discussed above is illustrated by the following examples:

EXAMPLE 4

Into a 200 ml. round-bottom flask equipped with mechanical stirrer and gas inlet and outlet tubes was placed the well ground mixture of 23.0 g. (0.0822 mole) of N,N - dimethylaminomethylferrocene hydrochloride and 5.66 g. (0.0411 mole, based on 100% $ZnCl_2$) of anhydrous zinc chloride of the initially stated degree of purity. Under a nitrogen blanket maintained throughout the condensation, the mixture was heated for 3 hours with stirring in an oil-bath adjusted to 170° C. At the end of the condensation, a sample of the brownish resinous mass on digesting with warm water no longer furnished a yellow-colored extract. After exhaustive extraction with warm water of the cold, powdered melt to remove catalyst traces and water-soluble complex XI, the residue was washed with isopropanol, dried in vacuo and taken up in a total of 100 ml. of benzene. Upon filtration, the benzene extract was poured slowly and with rapid agitation into the 7-fold quantity of 95% aqueous isopropanol. The precipitated yellow-brown polymer, after settling, was separated by filtration (or decantation of the supernatant mother-liquor, if the precipitate is resinous) and was thoroughly dried by heating it in vacuo at 60° for a period of 10 days. From the mother-liquor, a very small second polymer crop was obtained by evaporation, washing the resinous residue with isopropanol and drying as above, thus bringing the total crude yield to 13.78 g. or 84.5%.

$M_n$ 3890. *Analysis.*—Calcd. for III (R=H): C, 66.71; H, 5.09; Fe, 28.20. Found: C, 66.62; H, 5.18; Fe, 27.79.

By fractional precipitation in the manner outlined above under the heading "general procedure," the chromatographically prepurified crude polymer was further subdivided to give fractions of narrowed molecular weight distribution. A typical low molecular fraction thus collected showed the following analytical data:

$M_n$ 1230. *Analysis.*—Found: C, 66.87; H, 5.20; Fe, 28.01.

For a typical medium molecular and a typical high molecular fraction, the corresponding findings are as follows:

$M_n$ 3750. *Analysis.*—Found: C, 66.59; H, 5.15; Fe, 27.88.

$M_n$ 18,500. *Analysis.*—Found: C, 66.63; H, 5.24; Fe, 27.73.

The N,N-dimethylaminomethylferrocene hydrochloride used as the starting material in the above experiment was prepared by dissolving the free Mannich base in methanol and adding aqueous hydrochloric acid until Congo paper turned blue indicating free mineral acid. The salt was then precipitated by the addition of excess ether as fine yellow-orange needles, which were filtered off, washed with a methanol-ether blend and dried in vacuo. By concentration of the mother liquor in a high vacuum, a smaller second portion could be obtained bringing the total yield up to 85–90%.

*Analysis.*—Calcd. for $C_{13}H_{18}NClFe$: Cl, 12.73; Fe, 20.06. Found: Cl, 13.22; Fe, 20.40.

EXAMPLE 5

Using a 200 ml. round-bottom flask equipped as described in the preceding example, 20.0 g. (0.0822 mole) of N,N-dimethylaminomethylferrocene was blended under dry nitrogen with 5.66 g. (0.0411 mole, based on 100% $ZnCl_2$) of anhydrous zinc chloride, followed by the addition, with vigorous stirring, of 7.88 g. (0.0822 mole, based on 100% HCl) of 38% aqueous hydrochloric acid. The reactants were heated for 7 hours at 170° oil-bath temperature under a nitrogen blanket. The resinous reaction product, solidified at room temperature, was worked up as in Example 4 to give 14.8 g. of crude polymer (90.8% yield).

$M_n$ 8100. *Analysis.*—Found: C, 66.92; H, 5.30; Fe, 27.86.

Three typical subfractions analyzed as follows:

(1) $M_n$ 1790. *Analysis.*—Found: C, 66.49; H, 5.08; Fe, 28.07.

(2) $M_n$ 4100. *Analysis.*—Found: C, 66.77; H, 5.29; Fe, 27.85.

(3) $M_n$ 17,600. *Analysis.*—Found: C, 66.61; H, 5.17; Fe, 27.81.

EXAMPLE 6

The mixture of 20.0 g. (0.0822 mole) of N,N-dimethylaminomethylferrocene, 11.32 g. (0.0822 mole, based on 100% $ZnCl_2$) of anhydrous zinc chloride, and 1.5 g. (0.0833 mole) of water was heated for 5 hours at 180° C. in the manner described in Example 4. The reaction product was exhaustively extracted with boiling water, followed by isopropanol, and the residue was taken up in benzene and filtered from basic zinc chloride and traces of crosslinked matter. Further work-up was accomplished as in Example 4, giving 13.6 g. (83.4%) of crude polymer.

$M_n$ 5150. *Analysis.*—Found: C, 66.87; H, 5.23; Fe, 27.90.

A typical medium-molecular-weight fraction showed the following analytical data:

$M_n$ 6300. *Analysis.*—Found: C, 66.53; H, 5.08; Fe, 27.76.

For the polycondensation of adduct XII, the following examples are given for further illustration:

EXAMPLE 7

2.0 g. (0.002874 mole) of amorphous compound XII was heated in a test tube under nitrogen for nine hours at 170°. The reaction product was worked up as in Example 4, yielding 1.05 g. (92.2%) of crude polymer.

$M_n$ 4470. *Analysis.*—Found: C, 67.08; H, 5.22; Fe, 27.56.

The starting material used for the above condensation was prepared by heating at 170° under nitrogen with vigorous stirring N,N - dimethylaminomethylferrocene (IX), anhydrous zinc choloride and 38% aqueous hydrochloric acid in the amounts stated in Example 5. Total heating time was 15 minutes. The resinous melt was dissolved in boiling chloroform. From the filtered chloroform solution, the adduct XII was precipitated by adding excess ether. The resinous compound was allowed to settle on the bottom of the precipitation vessel and, upon decantation of the supernatant mother-liquor, was washed by digestion with boiling ether. From the concentrated mother-liquor, a second crop of less purity could be isolated by the addition of ether. After drying for 20 days at 60° in vacuo, the over-all yield amounted to 24.1 g. or 84.0%.

*Analysis.*—Calcd. for $C_{26}H_{26}N_2Cl_4ZnFe_2$: C, 44.90%; H, 5.22%; N, 4.03%; Cl, 20.39%; Fe, 16.06%.

(XI)

*Analysis.*—Found: C, 44.46%; H, 5.42%; N, 3.93%; Cl, 20.91%; Fe, 15.91%.

EXAMPLE 8

1.0 g. (0.001437 mole) of crystalline adduct XII was treated as in Example 7, to give 0.535 g. or 94.0% of crude polymer.

$M_n$ 5100. *Analysis.*—Found: C, 66.87%; H, 5.29%; Fe, 27.92.

The crystalline starting material employed in the above condensation was obtained from the amorphous adduct XII described in the preceding example by recrystallization from water; M.P. 128–130° C.

*Analysis.*—Found: C, 44.36%; H, 5.34%; N, 4.01%; Cl, 19.49%; Fe, 16.54%.

I claim:

1. A method of preparing ferrocene polymers having the structure

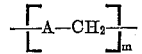

wherein *m* is an integer greater than one and —A— is selected from the class consisting of divalent ferrocene radicals and derivatives thereof in which at least one of the nuclear hydrogens of said radicals is substituted by a hydrocarbon group selected from the class consisting of low molecular weight alkyl, aryl and aralkyl radicals, said method comprising providing a Mannich base selected from the class consisting of N,N-dimethylaminomethylferrocene and derivatives thereof in which at least one of the nuclear hydrogens of the cyclopentadienyl rings is substituted by a hydrocarbon group selected from the class consisting of low molecular weight alkyl, aryl and aralkyl radicals; and heating said Mannich base in an inert atmosphere with an acid catalyst for a time and at a temperature to cause substantial polycondensation of said Mannich base with resultant formation of the above described ferrocene polymer.

2. The method of claim 1 wherein the catalyst is a Lewis acid.

3. The method of claim 2 wherein the Lewis acid is $ZnCl_2$.

4. The method of claim 1 wherein the catalyst consists essentially of $ZnCl_2$ and HCl in the proportions of about ½ mole of $ZnCl_2$ and 1 mole of HCl per mole of Mannich base.

5. The method of claim 1 wherein the catalyst consists essentially of $ZnCl_2$ and water in approximately equimolar proportions in relation to the Mannich base.

6. The method of claim 4 wherein the reaction temperature is about 150° to 180° C.

7. The method claim 5 wherein the reaction temperature is about 150° to 180° C.

References Cited by the Examiner

Luttringhaus et al.: Die Makromolekulare Chemie, Bd. 44–47, 1961, pp. 669–681.

Chemical Abstracts, an article by Nesmeyanov et al., vol. 55, 1961, p. 21082a–21083.

MURRAY TILLMAN, *Primary Examiner.*

WILLIAM H. SHORT, *Examiner.*